(12) United States Patent
Grossmann et al.

(10) Patent No.: US 9,529,342 B2
(45) Date of Patent: Dec. 27, 2016

(54) METHOD AND DEVICE FOR OPERATING AN ACTUATOR WITH A BRUSHLESS ELECTRIC MOTOR

(75) Inventors: Alex Grossmann, Leonberg (DE); Udo Sieber, Bietigheim (DE); Ralf Buehrle, Hochberg (DE); Zeynep Tosun, Istanbul (TR)

(73) Assignee: Robert Bosch GmbH, Stuttgart (DE)

( * ) Notice: Subject to any disclaimer, the term of this patent is extended or adjusted under 35 U.S.C. 154(b) by 397 days.

(21) Appl. No.: 13/699,476

(22) PCT Filed: May 10, 2011

(86) PCT No.: PCT/EP2011/057465
§ 371 (c)(1),
(2), (4) Date: Jan. 30, 2013

(87) PCT Pub. No.: WO2011/147672
PCT Pub. Date: Dec. 1, 2011

(65) Prior Publication Data
US 2013/0154539 A1    Jun. 20, 2013

(30) Foreign Application Priority Data

May 25, 2010  (DE) .................. 10 2010 029 271
Dec. 17, 2010  (DE) .................. 10 2010 063 326

(51) Int. Cl.
*H02P 6/00*    (2016.01)
*G05B 15/02*   (2006.01)
(Continued)

(52) U.S. Cl.
CPC ............... *G05B 15/02* (2013.01); *F02D 11/10* (2013.01); *F02D 35/0007* (2013.01);
(Continued)

(58) Field of Classification Search
CPC ............... H02P 6/14; H02P 6/08; H02P 6/085; H02K 29/12
(Continued)

(56) References Cited

U.S. PATENT DOCUMENTS 5,199,401 A * 4/1993 O'Neil et al. ................ 123/342
6,067,960 A   5/2000 Watanabe et al.
(Continued)

FOREIGN PATENT DOCUMENTS

DE    198 29 808    5/1999
DE    100 65 488    7/2001
(Continued)

OTHER PUBLICATIONS

International Search Report, PCT International Application No. PCT/EP2011/057465, dated Sep. 6, 2011.

*Primary Examiner* — Rina Duda
(74) *Attorney, Agent, or Firm* — Norton Rose Fulbright US LLP

(57) ABSTRACT

An actuator system for operating a flap valve in a motor vehicle, comprising: a drive system having an electronically commutated electric motor; a movable actuating member; a mechanism that couples the drive system to the actuating member so that a displacement of the actuating member is brought about upon activation of the drive system; a position sensor for sensing a position of the actuating member on the actuating member or in the mechanism, and for making available a corresponding position indication; a control unit to activate the drive system to move the actuating member, the electric motor of the drive system being electronically commutated, the control unit being configured to make available to the electric motor, in order to move the actuating member, activation signals dependent on the position indication made available, which signals bring about a pre-
(Continued)

defined drive torque or a predefined rotation speed of the electric motor.

10 Claims, 2 Drawing Sheets

(51) Int. Cl.
    *F02D 11/10*     (2006.01)
    *F02D 35/00*     (2006.01)
    *F02D 41/00*     (2006.01)
    *F02D 41/24*     (2006.01)
    *F16K 1/18*     (2006.01)
    *F02D 9/10*     (2006.01)

(52) U.S. Cl.
    CPC ..... *F02D 41/0077* (2013.01); *F02D 41/2432* (2013.01); *F02D 41/2464* (2013.01); *F16K 1/18* (2013.01); *F02D 9/105* (2013.01); *F02D 2200/0404* (2013.01); *Y02T 10/47* (2013.01)

(58) Field of Classification Search
    USPC ............ 318/400.01, 400.37, 400.38, 400.39
    See application file for complete search history.

(56) References Cited

U.S. PATENT DOCUMENTS

| | | | |
|---|---|---|---|
| 6,465,974 B2 | 10/2002 | Watanabe | |
| 6,602,161 B2 * | 8/2003 | Hemmingsen et al. | 477/79 |
| 6,679,362 B2 * | 1/2004 | Berger et al. | 192/31 |
| 6,695,657 B2 * | 2/2004 | Hattori | 440/84 |
| 6,823,754 B2 * | 11/2004 | Boll et al. | 73/865.9 |
| 6,850,018 B2 | 2/2005 | Zacher et al. | |
| 7,422,501 B2 * | 9/2008 | Mizushima et al. | 440/84 |
| 7,424,356 B2 * | 9/2008 | Jung et al. | 701/67 |

FOREIGN PATENT DOCUMENTS

| | | |
|---|---|---|
| DE | 10 2008 031 620 | 1/2010 |
| EP | 1 338 775 | 8/2003 |

\* cited by examiner

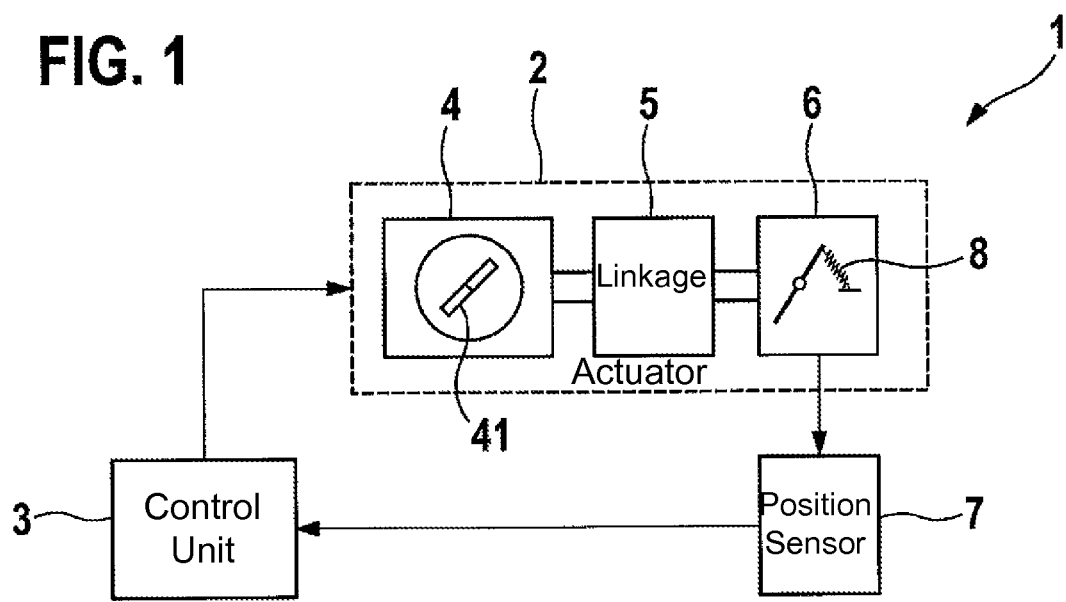
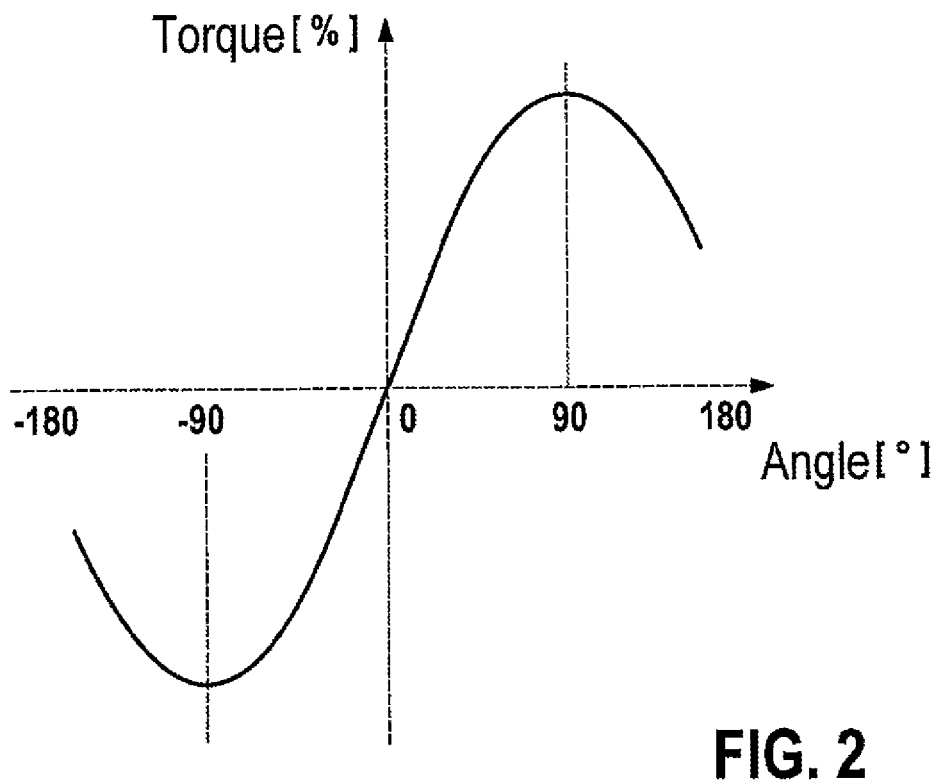

METHOD AND DEVICE FOR OPERATING AN ACTUATOR WITH A BRUSHLESS ELECTRIC MOTOR

FIELD OF THE INVENTION

The present invention relates to brushless electric motors for use in actuators, in which a position of an actuating member that is to be actuated can be read back by way of a position sensor.

BACKGROUND INFORMATION

Numerous actuators are used in a motor vehicle. The actuators usually encompass an electric-motor drive system, a linkage, and an actuating member whose position can be adjusted by the electric motor and via the linkage. Such actuators are used, for example, as throttle valve adjusters, as exhaust gas recirculation valves, for charge swirl flaps, and numerous comparable components.

Depending on the area of application, such actuators are often equipped with a position sensor to read back the actual position of the actuator. A position sensor of this kind can be used on the one hand to check the correct position of the actuating member. It is thereby possible to monitor whether the commanded position of the actuator also corresponds to the actual actuated position of the actuating member. On the other hand, with the aid of the actual position sensed by the position sensor, it is possible to carry out closed-loop position control of the actuating member, by controlling in closed-loop fashion the measured actual position as compared with a predefined target position.

Brush-commutated electric motors are usually used for such actuators. These motors have the disadvantage, however, that they exhibit degraded EMC characteristics due to the production of brush sparking. They furthermore have higher energy consumption, for example because the brushes rub against the commutator, and have a reduced service life because of the wear on the brushes.

These disadvantages do not apply to electronically commutated (brushless) electric motors. The latter do, however, require external commutation, which requires a knowledge of the rotor position. The usual methods for sensing rotor position use additional rotor position sensors in the electric motor, which make the actuator as a whole more expensive and moreover increase the wiring complexity between the actuator and a corresponding control unit. Sensorless methods, which are based, e.g., on a measurement of the voltage induced in the stator winding, also require complex circuitry in the control unit, and generally are too complex for use in an actuator.

Alternative methods, in which the rotor position is determined via a measurement of the rotor position-dependent inductance of the stator coils, likewise require complex circuitry in the control unit and in addition are not as robust and reliable as the sensor-based methods for measuring rotor position.

It is therefore an object of the present invention to provide an actuator, having an electronically commutated electric motor, that can be realized in simple fashion and does not exhibit the above disadvantages.

SUMMARY

According to a first aspect of the present invention, an example actuator system, in particular for operating a flap valve in a motor vehicle, is provided. The example actuator system encompasses:

- a drive system having an electronically commutated electric motor;
- a movable actuating member;
- a mechanism that couples the drive system to the actuating member so that a displacement of the actuating member is brought about upon activation of the drive system;
- a position sensor for sensing a position of the actuating member on the actuating member or in the mechanism, and for making available a corresponding position indication; and
- a control unit in order to activate the drive system to move the actuating member.

The electric motor of the drive system is electronically commutated, the control unit being embodied to make available to the electric motor, in order to move the actuating member, activation signals dependent on the position indication made available, which signals bring about a predefined drive torque or a predefined rotation speed of the electric motor.

One idea of the above actuator consists in the fact that the position sensor of the actuating member, which serves to check the position of the actuating member, can be used simultaneously as a rotor position sensor for the rotor position. As a result of the fixed coupling of the electric motor and the actuating member via the linkage, a position of the actuating member can be associated unequivocally with a rotor position of a rotor of the electric motor. The advantages of an electronically commutated electric motor for use in an actuator, for example avoidance of brush sparking, lower energy consumption, and lower friction, can thereby be achieved. At the same time, the additional complexity that would otherwise be made necessary by the use of a rotor position sensor can be avoided.

The mechanism can furthermore encompass a linkage having a predetermined step-up or step-down ratio.

According to an example embodiment, the control unit can be embodied to set a position of the actuating member by the fact that the control unit carries out a closed-loop position control action based on the position indication as actual value, the predefined drive torque or predefined rotation speed corresponding to a manipulated variable of the closed-loop position control action.

The control unit can furthermore be embodied to set a position of the actuating member by the fact that the control unit carries out a closed-loop position control action based on the position indication as actual value, the predefined drive torque or the predefined rotation speed corresponding to a manipulated variable of the closed-loop position control system.

According to a further aspect, a control unit is provided for operating an actuator, in particular for operating a flap valve in a motor vehicle, the actuator encompassing a drive system having an electronically commutated electric motor, a movable actuating member, a mechanism that couples the actuating member to the drive system, and a position sensor for sensing a position of the actuating member and for making available a position indication, the control unit being embodied to determine a rotor position of the electric motor of the drive system from the received position indication, and to make available activation signals for the electric motor that are dependent on the determined rotor position, which signals bring about a predefined drive torque or a predefined rotation speed of the electric motor.

According to a further aspect, an example method for operating an actuator, in particular for operating a flap valve in a motor vehicle, is provided, the actuator encompassing a drive system having an electronically commutated electric motor, a movable actuating member, a mechanism that couples the actuating member to the drive system, and a position sensor for sensing a position of the actuating member and for making available a position indication, the example method includes the following steps:

determining, from the position indication, a rotor position of the electric motor of the drive system; and making available activation signals, dependent on the determined rotor position, for activating the electric motor, which signals bring about a predefined drive torque or a predefined rotation speed of the electric motor.

According to a further aspect, an example method for calibrating an actuator system having the above actuator is provided. The example method includes the following steps:

activating the drive system so that a first motor magnetic field circulating at a predefined angular frequency is generated, and ascertaining a resulting time course of first position indications;

activating the drive system so that a second motor magnetic field circulating at the predefined angular frequency is generated, and ascertaining a resulting time course of second position indications, the first and the second motor magnetic field being determined variably as a function of a rotor-position-dependent counterforce acting on the actuating member;

ascertaining a difference of the angle differences between the direction of the motor magnetic field and the direction of an excitation magnetic field generated by the rotor, on the basis of a time shift of the time courses of the position indications;

based on the ascertained difference of the angle differences, ascertaining the angle difference between the direction of the motor magnetic field and the direction of an excitation magnetic field generated by the rotor, for a determined direction of the first motor magnetic field;

allocating the position indication sensed at the determined direction of the first motor magnetic field to a rotor position that corresponds to the determined direction, corrected with the aid of the ascertained angle difference, of the first motor magnetic field.

Provision can further be made that the time shift of the time courses of the position indications is ascertained by way of a correlation method.

According to a further aspect, an example apparatus for calibrating an actuator system having the above actuator is provided, the example apparatus being configured to activate the drive system so that a first motor magnetic field circulating at a predefined angular frequency is generated, and a resulting time course of first position indications is ascertained;

activate the drive system so that a second motor magnetic field circulating at the predefined angular frequency is generated, and a resulting time course of second position indications is ascertained, the first and the second motor magnetic field being determined variably as a function of a rotor-position-dependent counterforce acting on the actuating member;

ascertain a difference of the angle differences between the direction of the motor magnetic field and the direction of an excitation magnetic field generated by the rotor, on the basis of a time shift of the time courses of the position indications;

based on the ascertained difference of the angle differences, ascertain the angle difference between the direction of the motor magnetic field and the direction of an excitation magnetic field generated by the rotor, for a determined direction of the first motor magnetic field;

allocate the position indication sensed at the determined direction of the first motor magnetic field to a rotor position that corresponds to the determined direction, corrected with the aid of the ascertained angle difference, of the first motor magnetic field.

According to a further embodiment, an example actuator system is provided, including:

an electronically commutated actuating drive system;

an actuating member that is impinged upon by a counterforce and is coupled to the actuating drive system;

a position detector for detecting a position of the actuating member and for making available a position indication that indicates the position of the actuating member;

a control unit for carrying out a commutation of the actuating drive system in order to generate a motor magnetic field based on a rotor position ascertained with the aid of the position indication;

an apparatus for calibrating the actuator system, the apparatus authorizing the control unit to activate the drive system in such a way that a first motor magnetic field circulating at a predefined angular frequency is generated, and a resulting time course of first position indications is ascertained;

activate the drive system in such a way that a second motor magnetic field circulating at the predefined angular frequency is generated, and a resulting time course of second position indications is ascertained, the first and the second motor magnetic field being determined variably as a function of a rotor-position-dependent counterforce acting on the actuating member, the example apparatus being embodied to ascertain a difference of the angle differences between the direction of the motor magnetic field and the direction of an excitation magnetic field generated by the rotor, on the basis of a time shift of the time courses of the position indications;

based on the ascertained difference of the angle differences, ascertain the angle difference between the direction of the motor magnetic field and the direction of an excitation magnetic field generated by the rotor, for a determined direction of the first motor magnetic field;

allocate the position indication sensed at the determined direction of the first motor magnetic field to a rotor position that corresponds to the determined direction, corrected with the aid of the ascertained angle difference, of the first motor magnetic field.

According to a further aspect, an example computer program product is provided which contains a program code that, when it is executed on a data processing unit, carries out the above method for calibrating the actuator system.

BRIEF DESCRIPTION OF THE DRAWINGS

Preferred embodiments of the present invention are explained in further detail below with reference to the figures.

FIG. 1 schematically depicts an actuator system in which an external position sensor is used for commutation of the actuating drive system.

FIG. 2 is a diagram to illustrate the torque as a function of an angle difference between the motor magnetic field and the excitation magnetic field generated by the rotor, at a constant motor current.

DETAILED DESCRIPTION OF EXAMPLE EMBODIMENTS

Figure 3:
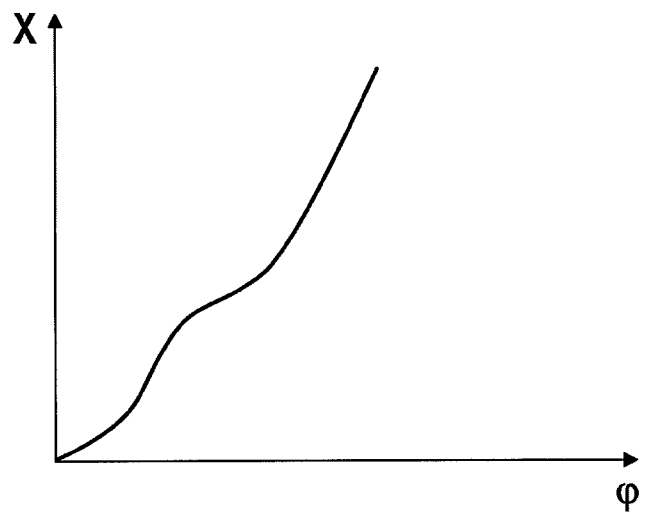
FIG. 3 is a diagram to illustrate the change in position indication as a function of rotor position in the context of a nonlinear linkage.

FIG. 1 shows an actuator system 1 having an actuator 2 that is activated by a control unit 3.

Actuator 2 encompasses an electric-motor drive system 4 that has an electronically commutated, i.e., brushless electric motor, for example a synchronous motor, an asynchronous motor, or the like. Drive system 4 has an output shaft that is coupled to a linkage 5. Linkage 5 is further coupled to an actuating member 6. Actuating member 6 is intended to be moved or displaced, as activated by control unit 3, into predefined positions or settings.

A position sensor 7 is disposed on actuating member 6, or alternatively on linkage 5. An actuating motion, or the position, of actuating member 6 can be sensed with the aid of position sensor 7. An indication as to the sensed position of actuating member 6 is transmitted to control unit 3. Position sensor 7 can have, for example, a giant magnetoresistive (GMR) sensor, a Hall sensor, or the like. Alternatively, optical methods can also be utilized. A detector voltage, for example, can be made available as a position indication to control unit 3, which digitizes the position indication, for example, with the aid of an analog-digital converter prior to further processing.

Actuators 2 of this kind are used, for example, in motor vehicles, e.g., in throttle valves, exhaust gas recirculation valves, charge swirl flaps, and numerous similar components. Such actuators 2 are used in particular in situations in which a correct actuating motion of actuator 2 is functionally essential, and must therefore be checked with the aid of the additional position sensor 7.

Upon displacement of actuating member 6, a counterforce opposite to the actuating motion acts on said member as a result of friction, both in linkage 5 and in the actuating drive system and the actuator. In addition, depending on the area of application, actuator 6 can be impinged upon by a return force that acts on actuating member 6 for example via a return spring 8, in particular a pre-tensioned return spring 8, so that actuator 6 is brought into an idle position when actuation drive system 4 is in a zero-current state.

A knowledge of the rotor position of a rotor provided in the electronically commutated electric motor of drive system 4 is generally necessary for operation of the electric motor. Activation occurs, generally, by way of activation signals or commutation signals, which cause a stator magnetization that results in generation of a drive torque. The activation signals change depending on the rotor position, in order to maintain generation of the drive torque. The motor magnetic field interacts with the excitation magnetic field that is generated by rotor 41, thus resulting in generation of a drive torque. With reference to a specific motor current through the stator windings, the torque generated is a function of the angle between the direction of the motor magnetic field and the direction of the excitation magnetic field. With reference to a specific motor current, the torque maximum is reached when the lead angle of the motor magnetic field with respect to the stator magnetic field reaches 90°. Deviations from this lead angle cause the torque to decrease with reference to the specific motor current. A curve for the torque at a specific motor current, plotted against lead angle, is shown in FIG. 2.

Provision is now made for dispensing with provision of a rotor position sensor or of a method for sensorless sensing of the rotor position, and instead for using position sensor 7, which is fixedly coupled to actuating member 6, to ascertain the present rotor position.

If position sensor 7 is tasked with checking the actual position of actuating member 2, the brushless electric motor of drive system 4 can be provided without the rotor position sensor, since the position of position sensor 7 can instead be used to derive the rotor position from the position of actuating member 6. Allocation of the position of actuating member 6 to the rotor position of the rotor of the electric motor is accomplished in consideration of the step-down or step-up ratio of linkage 5 or of the mechanism. The allocation occurs in control unit 3 with the aid of a predefined allocation function or a lookup table.

In an example, the electric motor of drive system 4 can be provided as a three-phase synchronous motor having two rotor pole pairs. The minimum commutation resolution is then equal to 30° of mechanical rotor position. This also corresponds to the required resolution for rotor position detection. Assuming a 1:30 step-up ratio in the linkage, a 1° resolution of position sensor 7 is then necessary for sufficient discrimination of the rotor position.

Actuators 2 in which the position of actuating member 6 is to be checked by way of a position sensor 7 are generally used in sensitive areas of the motor vehicle or the engine system. They therefore require a relatively high resolution of the position of actuating member 6. Implementation of actuator system 1 therefore does not, as a rule, require replacement of the existing position sensor 7 with one having higher resolution. This applies in particular to the use of actuator system 1 for a throttle valve in an internal combustion engine.

Control unit 3 senses the position of actuating member 6 via position sensor 7, and ascertains therefrom, with the aid of the step-up ratio of linkage 5, the instantaneous rotor position. Control unit 3 uses the rotor position to activate drive system 4 by applying the activation signals in such a way that a specific drive torque is made available. If drive system 4 encompasses a synchronous motor, control unit 3 then determines, with the aid of the sensed rotor position, which of the stator coils of the synchronous motor is to be energized in order to make available the requisite drive torque.

In order to displace actuating member 6, control unit 3 can implement a closed-loop position control action that is based on the sensed position of actuating member 6 as an actual value. Based on a, for example, external definition of a target position, a closed-loop position control action can be performed by way of the positional deviation of actuating member 6 from the target position, said action defining a drive torque of the electric motor as a manipulated variable. Activation signals for the electric motor can then be generated in accordance with the method described above, in order to implement the manipulated variable.

Upon initial operation of actuator system 1, no allocation exists between the position indication of position sensor 7 and the rotor position of the rotor of drive system 4. A calibration method is therefore provided, enabling the position indications to be converted into rotor positions. In conventional calibration methods for brushless electric motors, the rotor, or actuating member 6, travels over its displacement path in a controlled mode, the corresponding position indication is queried, and a corresponding allocation between a space vector angle of an applied motor magnetic field and the associated rotor position is recorded. This is performed under the assumption that in a controlled mode, the excitation magnetic field is oriented directly in the direction of the motor magnetic field.

In practice, however counterforces act as a result of frictional forces of, for example, linkage 5 or actuating member 6, or because of a return force; these counterforces can result, in controlled mode, in a deviation in the direction of the motor magnetic field with reference to the direction of the excitation magnetic field. In addition, as depicted, actuating member 6 can be impinged upon by return spring 8, the return force of which can lead to a considerable deviation in the orientations of the excitation magnetic field and of the motor magnetic field.

If a linkage 5 having a non-uniform step-down ratio is used, for example, the result can be a curve for a position indication X plotted against rotor position φ that is not linear, as depicted in FIG. 3.

In order to account for and eliminate the influence of these counterforces in the calibration method, provision is now made that, for a specific space vector angle of the commutation pattern that is activating actuation drive system 4, which pattern corresponds to a specific ratio of the phase voltages to one another, two different amplitude curves are provided. As a result of the counterforce that is acting, these result in different positions of actuating member 6, which result in curves of different position indications of position sensor 7.

Figure 4:
FIG. 4 is a diagram to illustrate the correlation between the counterforce acting on the rotor and the rotor position of the rotor.

For calibration of the actuator system 1 in which actuator 6 is coupled to drive system 4 via a nonlinear linkage 5 or a nonlinear mechanism, it is difficult to eliminate the influence of the counterforces that counteract the actuating motion (for example friction, or a return force resulting from return spring 8) in such a way that an unequivocal allocation between the position indication of position sensor 7 and the position of actuating member 6 in an actuator system 1 without return forces or without counterforces can ultimately be ascertained. For this, the brushless electric motor 4 is activated in two passes with a constant activation frequency, in such a way that a space vector angle of a motor magnetic field effected by the stator windings is moved at a constant angular frequency. The two passes are carried out with different amplitude curves, which differ by having different proportionality factors $a_1$, $a_2$. The amplitude curves are calculated as a function of the known course of the countertorque $M(\phi)$, on the basis of friction, counterforces, and return forces, plotted against the travel distance. One possible countertorque curve $M(\phi)$ is depicted in FIG. 4. The relevant equations are:

$$A_1 = a_1 \times M(\phi),$$

$$A_2 = a_2 \times M(\phi),$$

where the amplitudes $A_1$, $A_2$ are calculated as the product of the known countertorque curve $M(\phi)$ and the proportionality factors $a_1$, $a_2$ that differ from one another.

Alternatively, for a specific space vector angle, it is also possible to apply different amplitudes $A_1$, $A_2$, calculated from the above formulas, in succession. The amplitude can relate, for example, to a phase voltage or a phase current.

Because the amplitude of the voltage or the motor current is adapted to the curve of the counterforces, the latter can be compensated for in position-dependent fashion. The resulting difference angles $\Phi_1$ and $\Phi_2$ between the direction of the motor magnetic field and the direction of the excitation magnetic field are then calculated as $$\sin(\Phi_1) = c/a_1,$$

$$\sin(\Phi_2) = c/a_2,$$

where c corresponds to a constant but unknown multiplicative factor c for the countertorque curve $M(\phi)$ that represents sample variation, thermal effects, and aging effects along the actuation travel.

The correction factor c can be eliminated by trigonometric transformations, and the resulting equation for the difference angle ($\Phi_1$) is:

$$\sin(\Phi_1) = \frac{a_2}{a_1} \cdot \frac{h}{\sqrt{h^2 + \sqrt{\frac{a_2}{a_1} - \sqrt{1-h^2}}}}$$

where $h = \sin(\Phi_1 - \Phi_2)$.

The angle difference ($\Phi_1$)-($\Phi_2$) between the difference angles ($\Phi_1$), ($\Phi_2$), which corresponds to the angle difference between the motor magnetic field and the excitation magnetic field generated by the rotor, can be determined from the measured sensor values $X_1(t)$, $X_2(t)$ and a Δt (ascertained, for example, by a correlation method), where $X_1(t) = X_2(t+\Delta t)$, as follows:

$$(\Phi_1) - (\Phi_2) = \omega \Delta t,$$

where ω is the angular frequency of the sine-wave phase voltages or motor currents applied onto the stator windings, i.e. the angular frequency of the circulating space vector. Using the known relationship $$\phi t = \omega t + \phi_0,$$

where $\phi_0$ corresponds to the phase position at time t=0, and the ascertained angle difference ($\Phi_1$)-($\Phi_2$), the result is the rotor position $\phi^*(t)$ for an actuator system 1 in which no counterforces are acting on actuating member 6 or on the rotor of actuating drive system 4, as:

$$\phi^*(t) = \phi(t) - \Phi_1 = \omega t + \phi_0 - \Phi_1.$$

Replacing t with the inverse function of $X_1(t)$, the result is finally the desired relationship between the actual rotor position φ* and the position indication X.

What is claimed is:

1. A method for calibrating an actuator system, the actuator system including a drive system having an electronically commutated electric motor, a movable actuating member, a mechanism that couples the drive system to the actuating member so that a displacement of the actuating member is brought about upon activation of the drive system, and a position sensor to sense a position of the actuating member on the actuating member or in the mechanism, and to make available a corresponding position indication for commutation of the electric motor of the drive system, the method comprising:
   activating the drive system so that a first motor magnetic field circulating at a predefined angular frequency is generated, and ascertaining a resulting time course of first position indications;
   activating the drive system so that a second motor magnetic field circulating at the predefined angular frequency is generated, and ascertaining a resulting time course of second position indications, the first and the second motor magnetic field being determined variably as a function of a rotor-position-dependent counterforce acting on the actuating member;
ascertaining a difference of angle differences between a direction of the motor magnetic field and a direction of an excitation magnetic field generated by the rotor, on the basis of a time shift of time courses of the position indications;
ascertaining, based on the ascertained difference of the angle differences, angle difference between the direction of the motor magnetic field and the direction of an excitation magnetic field generated by the rotor, for a determined direction of the first motor magnetic field; and
allocating the position indication sensed at the determined direction of the first motor magnetic field to a rotor position that corresponds to the determined direction, corrected with the aid of the ascertained angle difference, of the first motor magnetic field.

2. The method as recited in claim 1, wherein the time shift of the time courses of the position indications are ascertained using a correlation method.

3. The method as recited in claim 1, wherein the motor magnetic fields are generated by stators of the drive system.

4. The method as recited in claim 1, wherein directions and amplitudes of the magnetic fields are each a function of the commutation of the electric motor.

5. The method as recited in claim 4, wherein the amplitudes are defined by motor current that flows through stator windings of the drive system.

6. The method as recited in claim 1, wherein the actuating member includes a restoring spring, and the counterforce is a result of friction within the actuator system and a restoring force by the restoring spring.

7. An apparatus for calibrating an actuator system having an actuator, the actuator including a drive system having an electronically commutated electric motor, a movable actuating member, a mechanism that couples the drive system to the actuating member so that a displacement of the actuating member is brought about upon activation of the drive system, and a position sensor to sense a position of the actuating member one of on the actuating member or in the mechanism, and to make available a corresponding position indication for commutation of the electric motor of the drive system, the apparatus comprising:
processing circuitry that includes an interface to a drive system and an interface to the position sensor and that is programmed to:
in a first activation and via the interface to the drive system, activate the drive system so that a first motor magnetic field circulating at a predefined angular frequency is generated; and
ascertain a time course of first position indications received via the interface to the position sensor, the first position indications resulting from the first activation;
in a second activation and via the interface to the drive system, activate the drive system so that a second motor magnetic field circulating at the predefined angular frequency is generated;
ascertain a time course of second position indications received via the interface to the position sensor, the second position indications resulting from the second activation, the first and the second motor magnetic field being determined variably as a function of a rotor-position-dependent counterforce acting on the actuating member;
ascertain a difference of angle differences between a direction of the motor magnetic field and a direction of an excitation magnetic field generated by the rotor, on the basis of a time shift of the time courses of the position indications;
ascertain, based on the ascertained difference of the angle differences, angle difference between the direction of the motor magnetic field and the direction of an excitation magnetic field generated by the rotor, for a determined direction of the first motor magnetic field; and
allocate the position indication sensed at the determined direction of the first motor magnetic field to a rotor position that corresponds to the determined direction, corrected with the aid of the ascertained angle difference, of the first motor magnetic field.

8. The apparatus of claim 7, wherein the processing circuitry is programmed with software that, when executed, causes the processing circuitry to perform the activations, ascertainments, and the allocation.

9. An actuator system, comprising:
an electronically commutated actuating drive system;
an actuating member that is impinged upon by a counterforce and is coupled to the actuating drive system;
a position detector to detect a position of the actuating member and to make available a position indication that indicates the position of the actuating member;
a control unit configured to carry out a commutation of the actuating drive system in order to generate a motor magnetic field based on a rotor position ascertained with the aid of the position indication; and
an apparatus to calibrate the actuator system, the apparatus authorizing the control unit to activate the drive system in such a way that a first motor magnetic field circulating at a predefined angular frequency is generated, and a resulting time course of first position indications is ascertained, and to activate the drive system in such a way that a second motor magnetic field circulating at the predefined angular frequency is generated, and a resulting time course of second position indications is ascertained, the first and the second motor magnetic field being determined variably as a function of a rotor-position-dependent counterforce acting on the actuating member, the apparatus being configured to ascertain a difference of angle differences between a direction of the motor magnetic field and a direction of an excitation magnetic field generated by the rotor, on the basis of a time shift of the time courses of the position indications, ascertain, based on the ascertained difference of the angle differences, angle differences between the direction of the motor magnetic field and the direction of an excitation magnetic field generated by the rotor, for a determined direction of the first motor magnetic field, allocate the position indication sensed at the determined direction of the first motor magnetic field to a rotor position that corresponds to the determined direction, corrected with the aid of the ascertained angle difference, of the first motor magnetic field.

10. A computer readable storage medium, storing program code to control an actuator for operating a flap valve in a motor vehicle, the actuator including an electronically commutated actuating drive system, an actuating member that is impinged upon by a counterforce and is coupled to the actuating drive system, a position detector to detect a position of the actuating member and to make available a position indication that indicates the position of the actuating member, a control unit configured to carry out a commutation of the actuating drive system in order to generate a motor magnetic field based on a rotor position ascertained with the aid of the position indication, and an apparatus to calibrate the actuator system, the apparatus authorizing the control unit to activate the drive system in such a way that a first motor magnetic field circulating at a predefined angular frequency is generated, and a resulting time course of first position indications is ascertained, and activate the drive system in such a way that a second motor magnetic field circulating at the predefined angular frequency is generated, and a resulting time course of second position indications is ascertained, the first and the second motor magnetic field being determined variably as a function of a rotor-position-dependent counterforce acting on the actuating member, the apparatus being configured to ascertain a difference of angle differences between a direction of the motor magnetic field and a direction of an excitation magnetic field generated by the rotor, on the basis of a time shift of the time courses of the position indications, ascertain, based on the ascertained difference of the angle differences, angle differences between the direction of the motor magnetic field and the direction of an excitation magnetic field generated by the rotor, for a determined direction of the first motor magnetic field, allocate the position indication sensed at the determined direction of the first motor magnetic field to a rotor position that corresponds to the determined direction, corrected with the aid of the ascertained angle difference, of the first motor magnetic field, the program code, when executed by a control unit, causing the control unit to perform:

activating the drive system so that a first motor magnetic field circulating at a predefined angular frequency is generated, and ascertaining a resulting time course of first position indications;

activating the drive system so that a second motor magnetic field circulating at the predefined angular frequency is generated, and ascertaining a resulting time course of second position indications, the first and the second motor magnetic field being determined variably as a function of a rotor-position-dependent counterforce acting on the actuating member;

ascertaining a difference of angle differences between a direction of the motor magnetic field and a direction of an excitation magnetic field generated by the rotor, on the basis of a time shift of time courses of the position indications;

ascertaining, based on the ascertained difference of the angle differences, angle difference between the direction of the motor magnetic field and the direction of an excitation magnetic field generated by the rotor, for a determined direction of the first motor magnetic field; and allocating the position indication sensed at the determined direction of the first motor magnetic field to a rotor position that corresponds to the determined direction, corrected with the aid of the ascertained angle difference, of the first motor magnetic field.

* * * * *